US009409584B2

(12) United States Patent
Jackson, Jr.

(10) Patent No.: US 9,409,584 B2
(45) Date of Patent: Aug. 9, 2016

(54) EXPEDITION CARTS AND ASSOCIATED SYSTEMS AND METHODS

(71) Applicant: Thomas Joseph Jackson, Jr., Ringoes, NJ (US)

(72) Inventor: Thomas Joseph Jackson, Jr., Ringoes, NJ (US)

(*) Notice: Subject to any disclaimer, the term of this patent is extended or adjusted under 35 U.S.C. 154(b) by 0 days.

(21) Appl. No.: 14/330,929

(22) Filed: Jul. 14, 2014

(65) Prior Publication Data

US 2015/0014966 A1  Jan. 15, 2015

Related U.S. Application Data

(60) Provisional application No. 61/845,986, filed on Jul. 13, 2013.

(51) Int. Cl.
*B62B 1/00* (2006.01)
*B62B 1/12* (2006.01)

(52) U.S. Cl.
CPC ............. *B62B 1/125* (2013.01); *B62B 2501/00* (2013.01); *Y10T 29/49622* (2015.01)

(58) Field of Classification Search
CPC ............. B62B 1/00; B62B 1/02; B62B 1/04; B62B 1/10; B62B 1/12; B62B 1/18; B62B 1/20
USPC ................. 280/659, 656, 462, 655.1, 43.131, 280/DIG. 11
See application file for complete search history.

(56) References Cited

U.S. PATENT DOCUMENTS

| 570,444 A | 11/1896 | Armstrong |
| 2,559,981 A * | 7/1951 | McBride ................. B62B 5/068 182/5 |
| 3,856,191 A | 12/1974 | Pohl |
| 4,045,040 A | 8/1977 | Fails |
| 4,429,897 A | 2/1984 | Friedman et al. |
| 4,588,197 A | 5/1986 | Benedetto, Jr. |
| 4,981,412 A | 1/1991 | Hawkins |
| 5,090,368 A | 2/1992 | Berghoefer |
| 5,330,212 A | 7/1994 | Gardner |
| 5,385,355 A | 1/1995 | Hoffman |
| 5,482,304 A | 1/1996 | Smith |
| 5,511,802 A | 4/1996 | Aitken |
| 5,526,894 A | 6/1996 | Wang |
| 5,586,778 A | 12/1996 | Lindh et al. |
| 5,607,170 A | 3/1997 | Capjon et al. |

(Continued)

OTHER PUBLICATIONS

Expedition Carts, Armadilling: An Open Source Project on Man Hauled Carts (2014), available at http://www.armadilling.com/trailers-carts-sledges/.

(Continued)

*Primary Examiner* — Bryan Evans
(74) *Attorney, Agent, or Firm* — McCarter & English, LLP

(57) ABSTRACT

Exemplary embodiments of an expedition cart are provided. The expedition cart includes a chassis configured and dimensioned to support a load. The expedition cart includes a first gusset plate and a second gusset plate secured to the chassis. The expedition cart further includes a first sleeve mounted to the first gusset plate and a second sleeve mounted to the second gusset plate. The first sleeve can be configured and dimensioned to releasably receive therein at least a portion of a first shaft arm. The second sleeve can be configured and dimensioned to releasably receive therein at least a portion of a second shaft arm. Exemplary expedition cart systems and methods of assembling an expedition cart are also provided.

22 Claims, 12 Drawing Sheets

(56) References Cited

U.S. PATENT DOCUMENTS

| | | |
|---|---|---|
| 5,622,294 A | 4/1997 | Evans |
| 5,673,928 A | 10/1997 | Jury |
| 5,687,978 A | 11/1997 | Rhodes et al. |
| 5,735,538 A | 4/1998 | Mosher et al. |
| 5,749,588 A | 5/1998 | Stallbaumer |
| 5,788,261 A | 8/1998 | Wu |
| 5,803,471 A | 9/1998 | DeMars et al. |
| 5,806,868 A | 9/1998 | Collins |
| 5,887,676 A | 3/1999 | Harbin |
| 5,887,879 A | 3/1999 | Chumley |
| 5,901,968 A | 5/1999 | Niedersteiner |
| 5,947,492 A | 9/1999 | Hallberg, Jr. |
| 5,975,543 A | 11/1999 | Mosher et al. |
| 5,984,327 A | 11/1999 | Hsieh et al. |
| 6,003,884 A | 12/1999 | Chang |
| 6,027,001 A | 2/2000 | Levitan |
| 6,039,333 A | 3/2000 | Hamblin |
| 6,053,516 A | 4/2000 | Ottaway |
| 6,070,906 A | 6/2000 | Allen |
| 6,092,817 A | 7/2000 | Kilmer |
| 6,120,042 A | 9/2000 | Mosher et al. |
| 6,139,033 A | 10/2000 | Western |
| 6,161,850 A | 12/2000 | James et al. |
| 6,164,672 A | 12/2000 | Hansen |
| 6,164,683 A | 12/2000 | Kalman |
| 6,193,264 B1 | 2/2001 | Seon |
| 6,196,561 B1 | 3/2001 | Trassinelli |
| 6,217,043 B1 | 4/2001 | Chumley |
| 6,260,864 B1 | 7/2001 | Smith |
| 6,302,430 B1 | 10/2001 | Wu |
| 6,308,968 B1 | 10/2001 | Hollingsworth |
| 6,332,620 B1 | 12/2001 | Mosher et al. |
| 6,334,622 B1 | 1/2002 | Romero |
| 6,341,787 B1 | 1/2002 | Mason |
| 6,349,949 B1 | 2/2002 | Gorringe |
| 6,352,269 B1 | 3/2002 | Chinigo |
| 6,382,642 B1 | 5/2002 | Rainey |
| 6,425,599 B1 | 7/2002 | Tsai |
| 6,431,556 B1 * | 8/2002 | Beardsley et al. ............. 280/1.5 |
| 6,565,103 B2 | 5/2003 | Wilson |
| 6,575,482 B2 | 6/2003 | Dombroskie et al. |
| 6,575,483 B1 * | 6/2003 | Davis .............................. 280/63 |
| 6,575,690 B1 * | 6/2003 | Ansotegui ..................... 414/444 |
| 6,685,198 B1 | 2/2004 | Hartman |
| 6,685,214 B2 | 2/2004 | Gregory |
| 6,688,635 B1 | 2/2004 | Watts |
| 6,698,811 B1 | 3/2004 | Schuchman |
| 6,733,016 B2 | 5/2004 | Chung |
| 6,789,808 B2 | 9/2004 | Yang |
| 6,796,564 B2 | 9/2004 | Kelly |
| 6,805,269 B2 | 10/2004 | Lockard |
| 6,837,502 B1 | 1/2005 | Lee |
| 6,935,643 B1 * | 8/2005 | Purpuro ..................... 280/47.32 |
| 6,942,228 B2 | 9/2005 | Bunce et al. |
| 6,962,353 B1 | 11/2005 | Garcia |
| 6,978,485 B2 | 12/2005 | Stude |
| 6,991,250 B2 | 1/2006 | Lindsey et al. |
| 7,004,495 B2 | 2/2006 | Thurm |
| 7,007,956 B1 * | 3/2006 | Pinon ............................. 280/1.5 |
| 7,017,939 B2 | 3/2006 | Darling, III |
| 7,036,832 B2 | 5/2006 | Gargaro |
| 7,063,340 B1 | 6/2006 | Wu |
| 7,111,851 B2 | 9/2006 | Duncan |
| 7,114,731 B2 | 10/2006 | Malrick |
| 7,172,207 B2 | 2/2007 | Henry |
| 7,175,188 B2 | 2/2007 | Joncourt |
| 7,246,802 B2 | 7/2007 | Yeung |
| 7,258,362 B2 | 8/2007 | Thurm |
| 7,311,313 B1 * | 12/2007 | Ray et al. ...................... 280/1.5 |
| 7,322,584 B1 * | 1/2008 | Parker ..................... 280/47.131 |
| 7,387,306 B2 | 6/2008 | Zimmer |
| 7,416,195 B2 | 8/2008 | Zwack |
| 7,422,223 B1 | 9/2008 | Silliman |
| 7,484,737 B2 | 2/2009 | Satorius |
| 7,549,648 B2 | 6/2009 | Girard et al. |
| 7,600,764 B1 | 10/2009 | Parker |
| 7,611,161 B2 | 11/2009 | Gross |
| 7,651,104 B1 | 1/2010 | Hilt |
| 7,661,683 B2 | 2/2010 | Fernandez |
| 7,677,591 B2 | 3/2010 | Chapman |
| 7,726,670 B2 | 6/2010 | Manus |
| 7,762,561 B2 | 7/2010 | Clatt |
| 7,793,744 B1 | 9/2010 | Hardie |
| 7,938,409 B2 | 5/2011 | Mejia |
| 8,056,781 B1 | 11/2011 | Rowe |
| 8,091,899 B2 | 1/2012 | Mejia |
| 8,100,816 B2 | 1/2012 | Daniel |
| 8,141,887 B1 | 3/2012 | Poteat |
| 8,162,348 B2 | 4/2012 | Thomas |
| 8,267,409 B2 | 9/2012 | Gross |
| 8,376,391 B2 | 2/2013 | Voves |
| 8,424,899 B1 * | 4/2013 | Larson ................. A61G 1/0231 280/640 |
| 8,695,992 B2 | 4/2014 | Piaget et al. |
| 8,789,730 B2 | 7/2014 | Mroczka |
| 8,833,776 B2 | 9/2014 | Boulanger et al. |
| 8,893,937 B1 | 11/2014 | Bristol |
| 8,967,557 B2 | 3/2015 | Struck, II |
| 8,979,095 B2 | 3/2015 | Lewis |
| 2001/0040350 A1 | 11/2001 | Allen et al. |
| 2002/0089134 A1 | 7/2002 | Salzberger et al. |
| 2003/0080538 A1 | 5/2003 | Watts et al. |
| 2003/0127476 A1 | 7/2003 | Lockard |
| 2004/0016781 A1 | 1/2004 | Smith |
| 2004/0150175 A1 | 8/2004 | Cepull |
| 2004/0155435 A1 | 8/2004 | Watts |
| 2004/0188963 A1 | 9/2004 | Gant |
| 2005/0077705 A1 * | 4/2005 | Malrick ........................ 280/647 |
| 2005/0115998 A1 | 6/2005 | Swenson |
| 2006/0055128 A1 | 3/2006 | Scott et al. |
| 2006/0120277 A1 | 6/2006 | Katz |
| 2006/0151963 A1 | 7/2006 | Epley |
| 2006/0196901 A1 | 9/2006 | Benk |
| 2007/0063467 A1 | 3/2007 | Hurtgam |
| 2007/0063468 A1 | 3/2007 | Hurtgam |
| 2007/0075105 A1 | 4/2007 | Petrin |
| 2007/0187910 A1 | 8/2007 | Adams |
| 2007/0252357 A1 * | 11/2007 | Hoskins ..................... 280/415.1 |
| 2008/0018063 A1 | 1/2008 | Morowat |
| 2008/0174078 A1 | 7/2008 | Dooley |
| 2008/0238024 A1 | 10/2008 | Heidenreich et al. |
| 2008/0296326 A1 | 12/2008 | Berlin et al. |
| 2008/0296851 A1 | 12/2008 | Hall |
| 2009/0057355 A1 | 3/2009 | Weiss |
| 2009/0079144 A1 | 3/2009 | Satorius |
| 2011/0062196 A1 | 3/2011 | Weiss |
| 2013/0048685 A1 | 2/2013 | Durkos |
| 2014/0008402 A1 | 1/2014 | Dickson |
| 2014/0265167 A1 | 9/2014 | Mejia |
| 2015/0091275 A1 | 4/2015 | Jordan |

OTHER PUBLICATIONS

PCT International Search Report and Written Opinion dated Nov. 10, 2014 for International Application No. PCT/US2014/046547.
PCT/US2014/046547, Jul. 14, 2014.
PCT/US2014/46547, Jul. 14, 2014.
PCT/US2014/046547, Jul. 14, 2014, WO 2015/009630.

\* cited by examiner

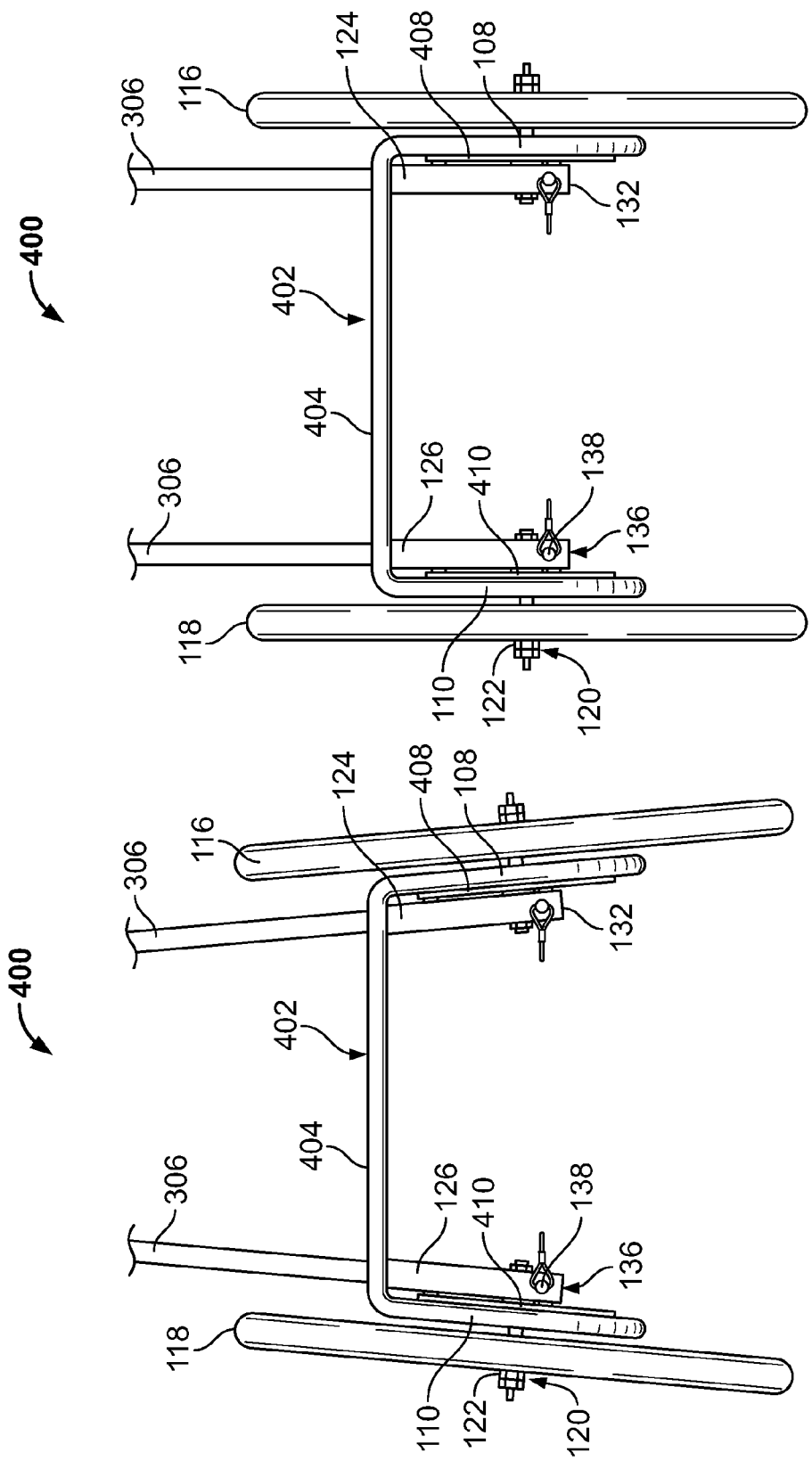

EXPEDITION CARTS AND ASSOCIATED SYSTEMS AND METHODS

CROSS-REFERENCE TO RELATED APPLICATIONS

This application claims the benefit of U.S. Provisional Patent Application No. 61/845,986, which was filed on Jul. 13, 2013. The entire content of the foregoing provisional patent application is incorporated herein by reference.

TECHNICAL FIELD

The present invention generally relates to lightweight expedition carts for use in carrying supplies over outdoor terrains and, in particular, to expedition carts which are capable of being customized based on user characteristics or a user activity, and including components for enhanced load and force distribution, sleeve mounting, and hub reinforcement.

BACKGROUND

Expeditions are a function of distance, load, time, terrain, and packed gear. Regardless of the destination, be it mountaintop or ocean shore, the most grueling aspect of outdoor expeditions is not the distance, but rather the burden carried. Shouldered loads arrest or abort more expeditions than blistered toes. One method of carrying loads during long distance expedition trips is to pack items in a backpack and wear the backpack on one's body. However, over time, this can cause physical injury to a person's back, hip, legs, or feet.

Thus, a need exists for a means of carrying loads during an expedition over a variety of terrains which reduce the weight supported by the person and reduce the risk of injury to the person. These and other needs are addressed by the expedition carts and associated systems and methods of the present disclosure.

SUMMARY

In accordance with embodiments of the present disclosure, exemplary expedition carts, e.g., pull carts, are provided that allow a person to carry heavy loads during an expedition over a variety of terrains or landscapes for long distances. The expedition carts can be fabricated of sturdy materials which allow the expedition cart to endure virtually any terrain encountered throughout extended epics of travel. Use of an expedition cart to carry expedition equipment and supplies can alleviate or eliminate the problems associated with an expedition. The expedition cart can be easily and effectively pulled and maneuvered over a variety of terrains, including rough terrains. In addition, due to the lightweight structure of the expedition cart, the user can disassemble, store and carry the expedition cart when the terrain becomes unsuitable for use of the expedition cart or pulling the expedition cart becomes impractical, e.g., during very steep inclines and declines, extremely muddy terrain, river crossings, and the like. The expedition cart can be fabricated from lightweight materials, resulting in a lightweight expedition cart, yet strong enough to endure rough use. The exemplary expedition cart can therefore be easily maneuvered and can be disassembled and carried by a user when desired.

In accordance with embodiments of the present disclosure, exemplary expedition carts are provided that include a chassis configured and dimensioned to support a load. The expedition carts include first and second gusset plates secured to the chassis. The expedition carts further include a first sleeve mounted to the first gusset plate and a second sleeve mounted to the second gusset plate. The first sleeve can be configured and dimensioned to releasably receive therein at least a portion of a first shaft arm. The second sleeve can be configured and dimensioned to releasably receive therein at least a portion of a second shaft arm.

In some embodiments, the first and second shaft arms can be telescoping. In such embodiments, each of the first and second shaft arms can include a first tubular member and a second tubular member. The second tubular member can be configured to translate within the first tubular member.

The chassis can include a pair of substantially horizontal segments joined by a pair of side segments. The chassis can be fabricated from, e.g., a higher quality aluminum tubing, titanium tubing, carbon, and the like. In some embodiments, one or more sections of the horizontal segments can be wrapped or can include insulating foam or rubber tubing which can cushion the load on the expedition cart, dampen stresses, and add a frictional coefficient to reduce the hazard of load slippage. The pair of side segments can be V-shaped. In some embodiments, the pair of side segments can be outwardly splayed or angled relative to the pair of horizontal segments. First and second wheels mounted to the pair of side segments can be outwardly splayed relative to the pair of horizontal segments, thereby providing greater stability to the expedition cart. It should be understood that outwardly splayed refers to the wheels being positioned closer relative to each other at the top surfaces of the wheels and further apart relative to each other at the bottom or ground-contacting surface of the wheels. The first and second wheels can be mounted to the chassis by two separate and aligned hub bolts. In splayed wheel embodiments, the hub bolts for the wheels can be angled relative to each other.

In some embodiments, the first and second sleeves can be fixedly mounted to the first and second gusset plates, respectively. In some embodiments, the first and second sleeves can be pivotally or adjustably mounted to the first and second gusset plates, respectively. Pivoting the first and second sleeves relative to the first and second gusset plates can vary an angle of inclination of the first and second shaft arms relative to the first and second gusset plates and the chassis. An adjustment of the angle of inclination of the first and second shaft arms allows customization of the expedition cart to ensure that the loading deck defined by the horizontal segments of the chassis can be substantially level during trekking on level ground. Each of the first and second sleeves includes a pivot point and a locking mechanism, e.g., a spring-loaded pin. The first and second gusset plates can include a plurality of radially spaced holes. Each of the plurality of radially spaced holes can be configured and dimensioned to receive the locking mechanism of the first and second sleeves.

In some embodiments, the first and second shaft arms can include a flattened distal portion. The flattened distal portion can include a bore, e.g., a center bore, extending therethrough. The flattened distal portion and the bore of each of the first and second shaft arms can be configured to be received by and interlock relative to an interlocking mechanism of a belt or harness worn by a user.

In some embodiments, each of the first and second shaft arms can be at least partially filled with a dampening material, e.g., a core rod of plastic, to absorb and dampen impact stresses. Each of the first and second shaft arms can include a bracket, e.g., a spring-loaded clip, mounted thereon near a distal end. The bracket can be configured and dimensioned to releasably receive an elongated structure, e.g., a walking stick, therein. The elongated structure can be used to push and/or pull the expedition cart.

In accordance with embodiments of the present disclosure, exemplary expedition cart systems are provided that include an expedition cart as described herein. The systems further include a belt or harness to be worn by a user. The belt or harness can include a pair of interlocking mechanisms which can be configured and dimensioned to releasably interlock the flattened portion of the first and second shaft arms therein. Thus, rather than gripping and pulling the expedition cart, the expedition cart can be pulled through the belt or harness of the user.

In accordance with embodiments of the present disclosure, exemplary methods of assembling an expedition cart are provided that include providing an expedition cart as described herein. The methods include releasably securing at least a portion of a first shaft arm within the first sleeve and releasably securing at least a portion of a second shaft arm within the second sleeve. In some embodiments, the methods include pivoting the first and second sleeves to vary an angle of inclination of the first and second shaft arms relative to the first and second gusset plates and the chassis. The expedition cart can thereby be customized based on user characteristics (e.g., height), the type of activity for which the expedition cart will be used, user preferences, and the like.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed expedition carts and associated systems and methods, reference is made to the accompanying figures, wherein:

FIG. 14 is a detailed, front view of an exemplary chassis according to the present disclosure; and FIG. 15 is a detailed, front view of an exemplary chassis according to the present disclosure.

DESCRIPTION OF EXEMPLARY EMBODIMENTS

Figure 1:
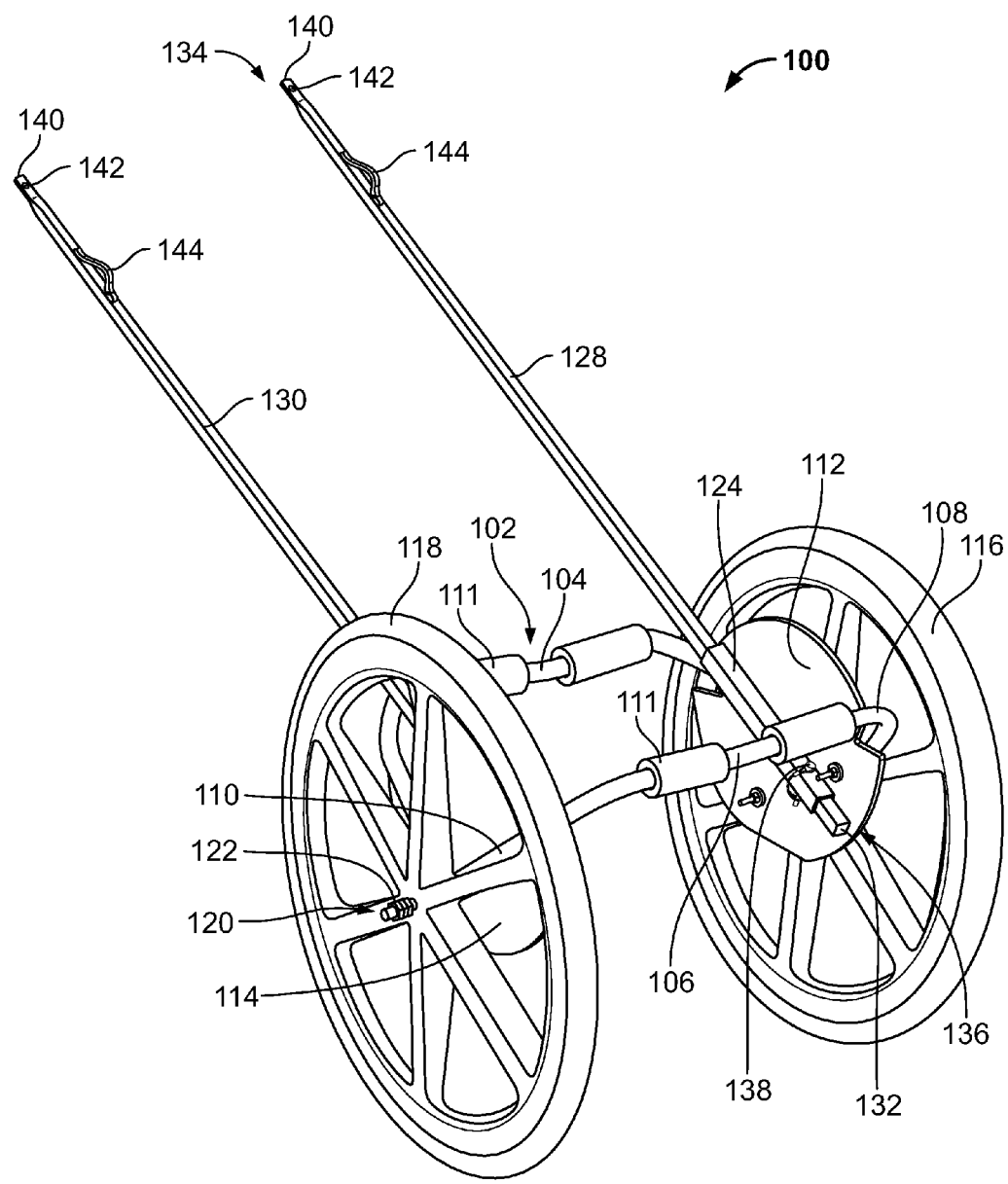
FIG. 1 is a perspective, front view of an exemplary expedition cart according to the present disclosure.
Figure 2:
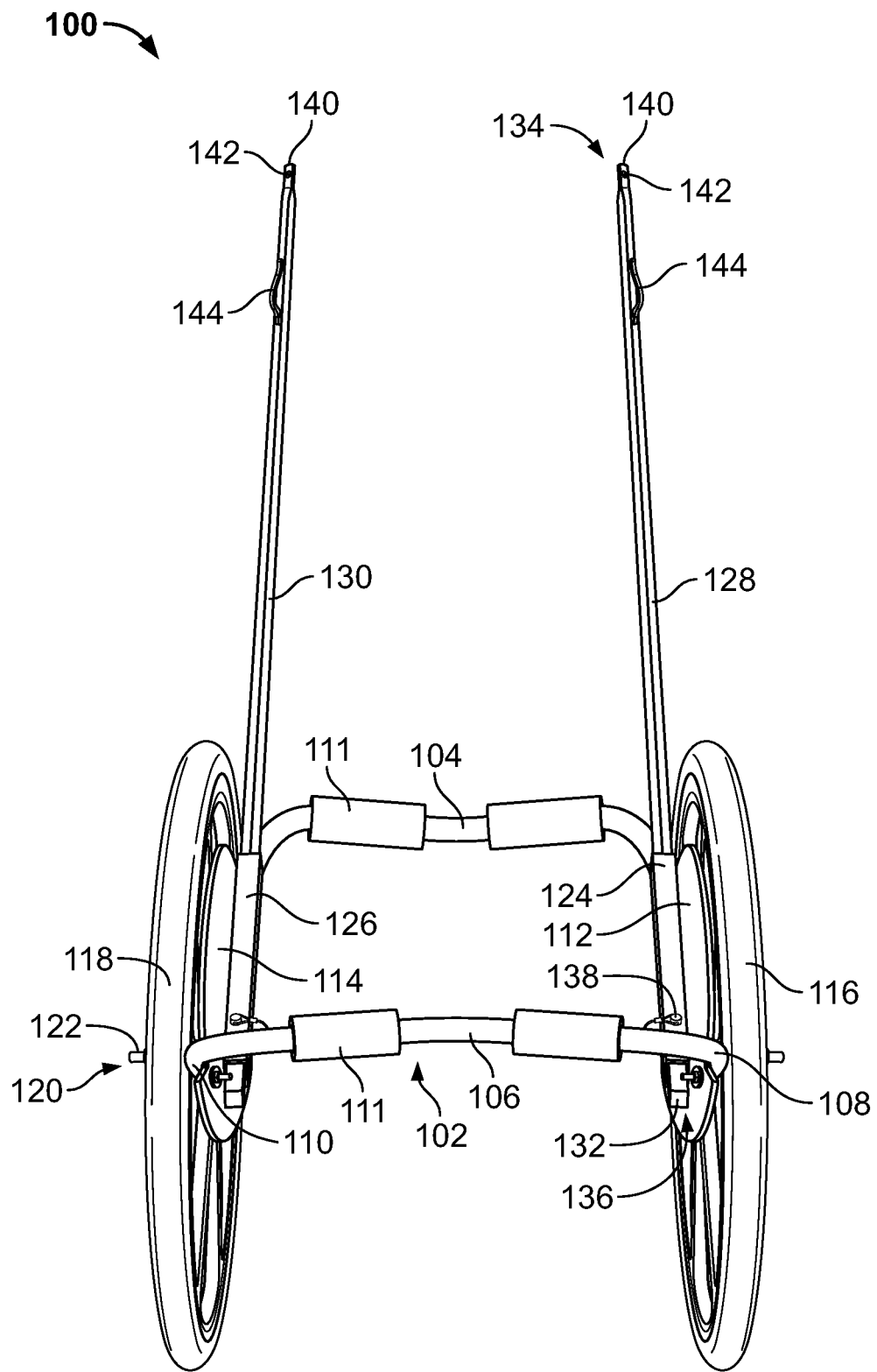
FIG. 2 is a front view of the exemplary expedition cart of FIG. 1.
Figure 3:
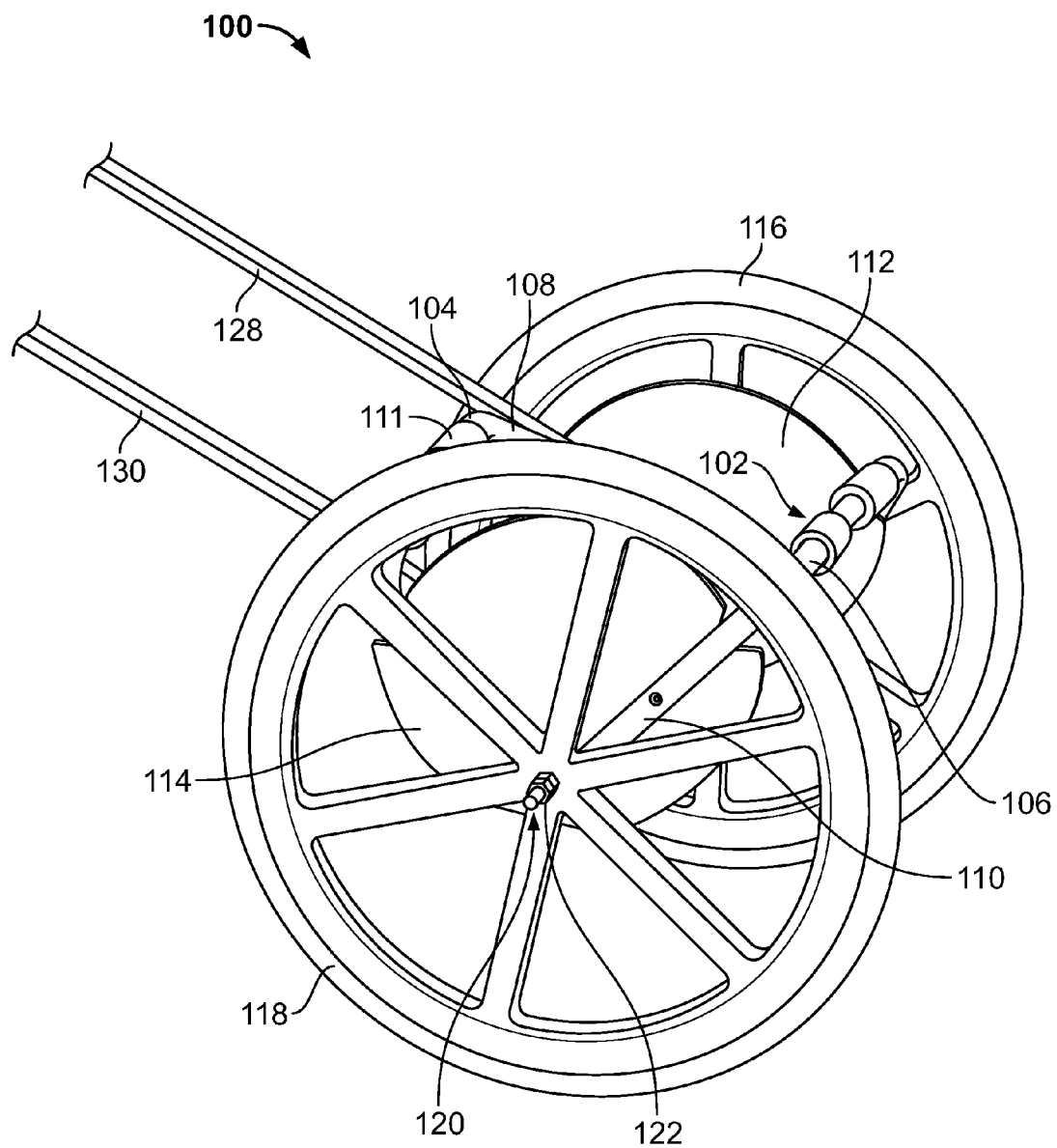
FIG. 3 is a detailed, side view of the exemplary expedition cart of FIG. 1.
Figure 4:
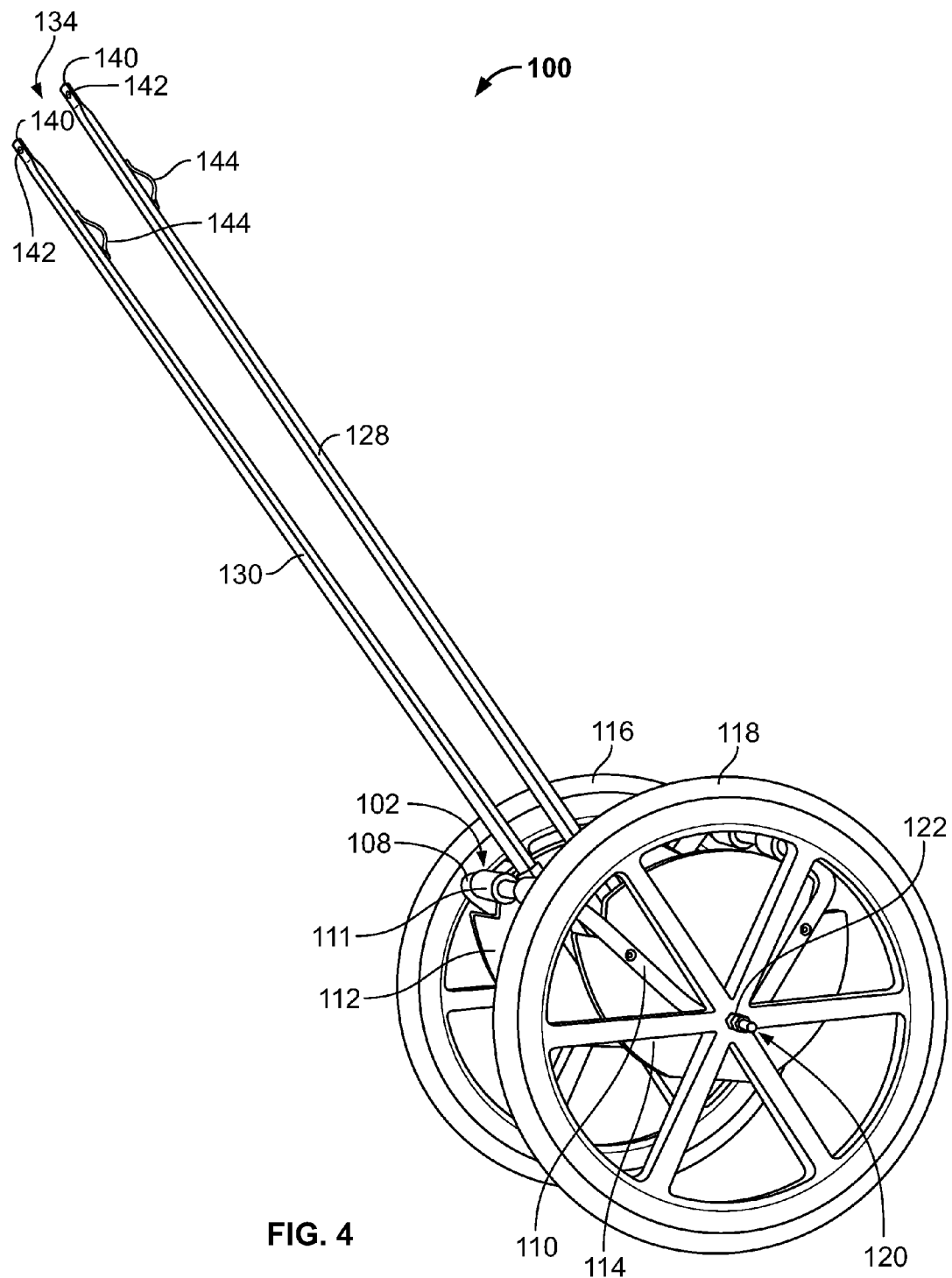
FIG. 4 is a side view of the exemplary expedition cart of FIG. 1.
Figure 5:
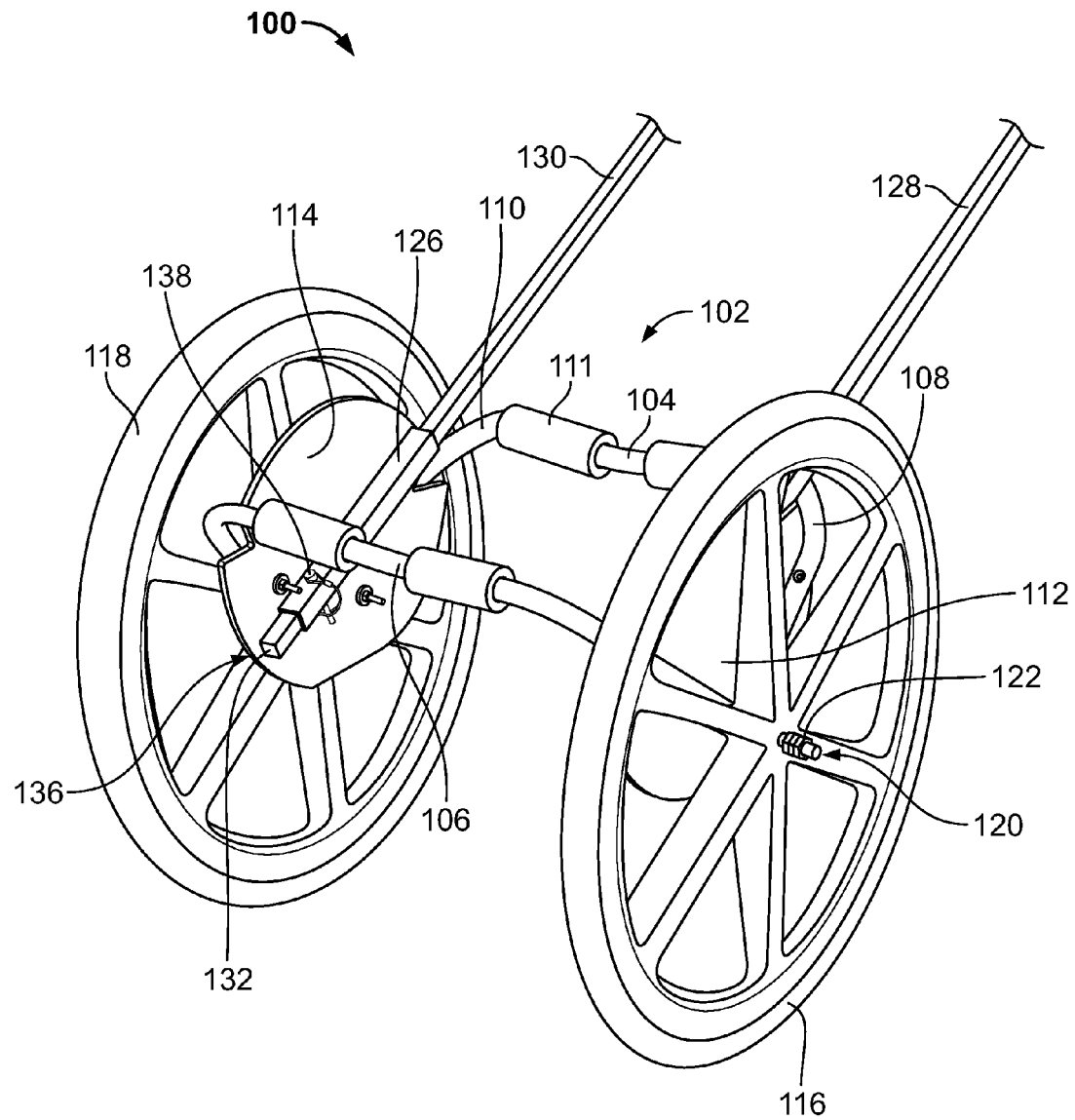
FIG. 5 is a perspective, front view of a chassis of the exemplary expedition cart of FIG. 1.
Figure 6:
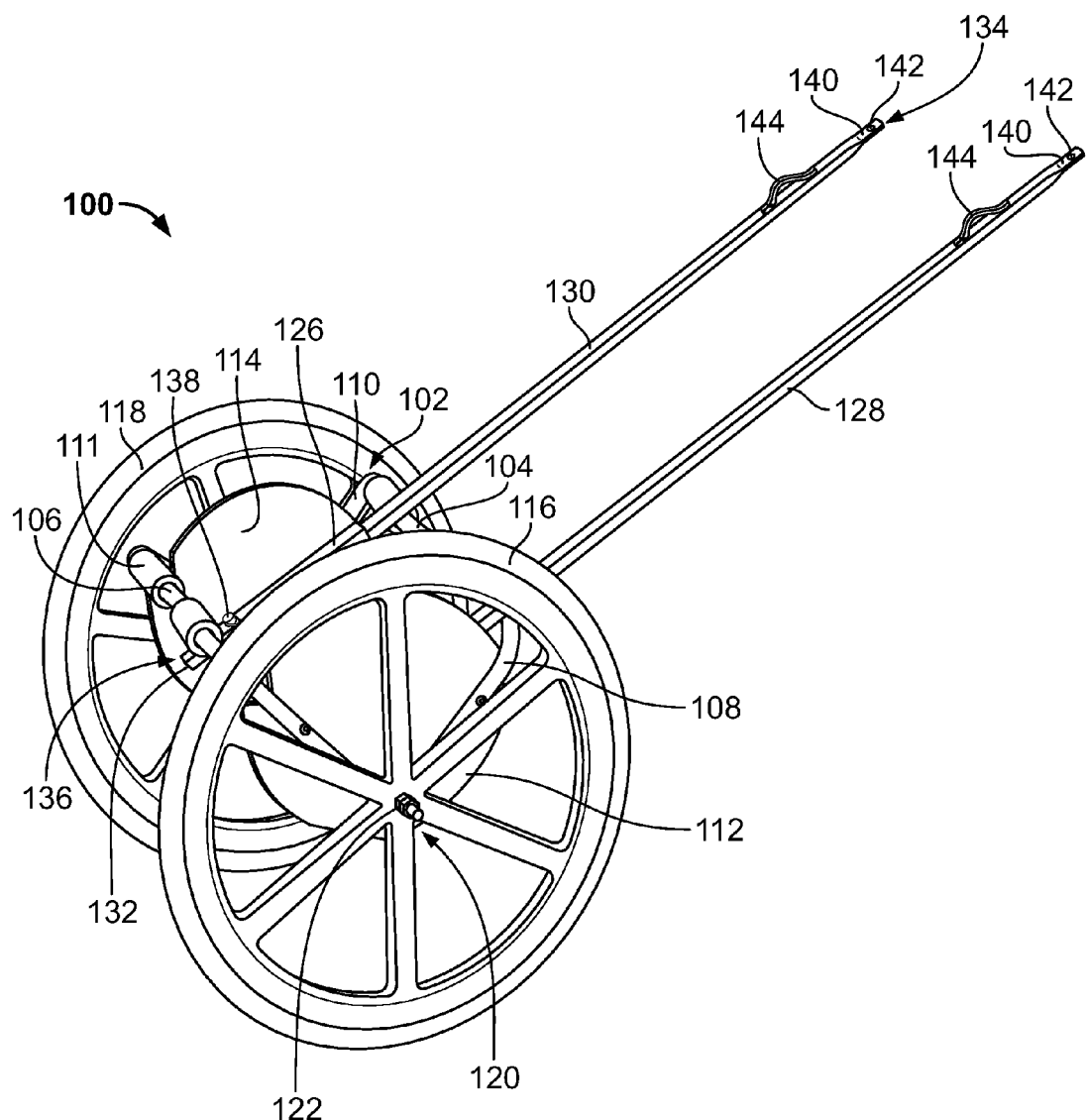
FIG. 6 is a perspective, side view of the exemplary expedition cart of FIG. 1.

With reference to FIGS. 1-8, an exemplary expedition cart 100 is provided that includes a chassis 102, e.g., a frame body, for supporting a load to be carried on the expedition cart 100. The chassis 102 includes a pair of substantially horizontal segments 104, 106 joined together by a pair of side segments 108, 110. In some embodiments, one or both of the horizontal segments 104, 106 can include a bend along the length of the horizontal segments 104, 106. For example, one or both of the horizontal segments 104, 106 can include a bend at a substantially central portion to form a groove into which a load to be carried can be positioned. The bend or curve in the horizontal segments 104, 106 can assist in maintaining a load positioned on the chassis 102 in the desired position. In some embodiments, the horizontal segments 104, 106 can be substantially linear and the load can be maintained on the chassis 102 by implementing attachment means, e.g., pack straps, rope, bungee cables, combinations thereof, and the like.

The side segments 108, 110 can be V-shaped or L-shaped, the endpoints of which join the horizontal segments 104, 106. The side segments 108, 110 thereby create a separation between the horizontal segments 104, 106 which defines the loading deck onto which a load can be positioned. In particular, the horizontal segments 104, 106 act as spreaders which define the width of the expedition cart 100 and represent the entirety of the gear storage surface of the expedition cart 100. For example, a backpack can be positioned on the horizontal segments 104, 106 such that the horizontal segments 104, 106 support the backpack thereon. In some embodiments, one or both of the horizontal segments 104, 106 can include one or more support elements 111, e.g., foam tubing wrapped around the horizontal segments 104, 106, a rubber coating, and the like. In some embodiments, the support elements 111 can be in the form of a textured surface. The support elements 111 can provide a cushion for the load positioned on the chassis 102, can dampen stresses on the chassis 102, and add a frictional coefficient to reduce the hazard of load slippage.

In some embodiments, the chassis 102 can be fabricated from a high quality aluminum tubing which is bent into the desired shape. In some embodiments, the chassis 102 can be fabricated from a molded carbon fiber, titanium or equivalently strong and lightweight material. For example, titanium can provide the desired rigidity of the chassis 102 and the desired strength to support a heavy load during an expedition. However, it should be understood that alternative materials can be implemented as long as the materials are capable of withstanding loads and stresses associated with transporting supplied in a variety of terrains. For example, materials can be selected based on the type of activity the expedition cart 100 will be implemented for. As an example, an expedition cart 100 to be used in mountain trekking which will require lifting of the expedition cart 100 to cross rivers can be fabricated from lighter materials than an expedition cart 100 to be used for transporting items to a beach. Although illustrated as substantially tubular in cross-section, in some embodiments, the chassis 102 can define a square cross-section.

The expedition cart 100 includes a pair of gusset plates 112, 114 attached to the respective side segments 108, 110. The gusset plates 112, 114 can provide a mounting surface for additional components of the expedition cart 100 and can act to unify and reinforce the chassis 102. In some embodiments, the gusset plates 112, 114 can be patterned and cut from squares of, for example, ¼ inch aluminum flat sheets. However, alternative lightweight materials, e.g., titanium, carbon, and the like, can also be implemented. Although illustrated as substantially circular in shape, in some embodiments, the gusset plates 112, 114 can define, e.g., rectangular, trapezoidal, triangular shapes, and the like.

The gusset plates 112, 114 can be attached to the side segments 108, 110 of the chassis 102 by, e.g., welding or through-bolts for each side segment 108, 110, combinations thereof, and the like. However, alternative connection techniques can be used as viable alternative to mount the gusset plates 112, 114 to the chassis 102. When the expedition cart 100 moves under a load, the gusset plates 112, 114 can distribute forces through the chassis 102, thereby reducing localized stress and eccentric moment events. The gusset plates 112, 114 can provide enhanced load and force distribution, sleeve mounting surfaces, and hub reinforcement. It should be understood that alternative configurations or designs of the gusset plates 112, 114 can be used, e.g., smaller gusset plates 112, 114. In particular, as long as structural integrities are maintained, smaller gusset plates 112, 114 generally relates to a lighter expedition cart 100.

Wheels 116, 118 can be mounted to the chassis 102 at each respective side segment 108, 110. The wheels 116, 118 can be mounted to the side segments 108, 110 with wheel hubs or hub bolts 120. In some embodiments, the nadir of the V-shape or L-shape of the side segments 108, 110 can be flattened such that the side segments 108, 110 can mate relative to a wheel hub. In some embodiments, the nadir of the side segments 108, 110 can remain substantially round in cross-section and a pivot hole can be drilled through the side segments 108, 110 and the gusset plates 112, 114 to receive a hub bolt 120, e.g., an axle. The wheels 116, 118 can be secured to the hub bolt 120 with a locking nut 122.

Although illustrated as substantially perpendicular to the horizontal segments 104, 106, in some embodiments, the side segments 108, 110 can be gradually angled or splayed relative to the horizontal segments 104, 106. For example, the side segments 108, 110 can be positioned closer relative to each other at the points of contact with the horizontal segments 104, 106 and can be angled outwardly by, e.g., approximately three degrees, approximately five degrees, approximately seven degrees, and the like, such that the side segments 108, 110 are positioned further apart relative to each other at the nadir of the side segments 108, 110. The angled or splayed side segments 108, 110 can result in angled or splayed mounting of the wheels 116, 118 relative to the chassis 102. The angled or splayed wheels 116, 118 can provide additional stability for the expedition cart 100 and reduce or prevent instances of the chassis 102 flipping over when the wheels 116, 118 pass over obstacles.

In some embodiments, the wheels 116, 118 can include spokes 116, 118. In some embodiments, the wheels 116, 118 can be spokeless and can include solid tires which are positioned outside of the chassis 102. The hub bolts 120 on which the wheels 116, 118 are mounted can be of a quick release type. The hub bolts 120 can extend through the gusset plate 112, 114, the chassis 102 and the wheel 116, 118. By providing wheels 116, 118 on separate hub bolts 120 (rather than on a single wheel axle), the ground clearance of the expedition cart 100 can be raised substantially above the height of the axis of rotation of the wheels 116, 118.

For example, in some embodiments, the wheels 116, 118 define a diameter of approximately twenty-four inches and an axis of rotation at a height from the ground of approximately twelve inches. However, the load carried on the loading deck defined by the horizontal segments 104, 106 of the chassis 102 can be at a height of approximately nineteen inches, providing the expedition cart 100 with additional ground clearance of approximately seven inches as compared to a cart having a single central wheel axle. The expedition cart 100 can thereby avoid becoming caught on a greater number of ground obstacles, such as small bushes, rocks, branches, and the like. It should be understood that the dimensions of the expedition cart 100 discussed herein, including the width of the horizontal segments 104, 106 and the size of the wheels 116, 118, can be varied while still falling within the intended scope of the invention. For example, in some embodiments, when the expedition cart 100 is disassembled and strapped to a backpack worn by a user, the twenty-four inch wheels 116, 118 can provide sufficient clearance of the backpack, while being positioned adjacent to the back of the user. Although the wheels 116, 118 can be dimensioned to be greater than twenty-four inches, a greater height of the wheels 116, 118 can increase the height of the chassis 102, thereby resulting in risk of less stability of the chassis 102. In such embodiments, stability of the chassis 102 can be increased by, e.g., increasing the splay of the wheels 116, 118 relative to the chassis 102, increasing the width between the wheels 116, 118, combinations thereof, and the like.

The expedition cart 100 further includes a pair of shaft-arm or handle sleeves 124, 126. The sleeves 124, 126 can be fabricated from, e.g., aluminum, carbon, titanium, and the like. The sleeves 124, 126 can be mounted to the gusset plates 112, 114 by welding. For example, the sleeves 124, 126 can be welded to the gusset plates 112, 114 at an angle designed to maintain a level loading deck defined by the horizontal segments 104, 106 while traveling on level ground.

In some embodiments, the sleeves 124, 126 can be pivotally positioned relative to the gusset plates 112, 114 such that the angle of inclination of the sleeves 124, 126 relative to the loading deck of the chassis 102 can be adjusted or customized based on user characteristics, e.g., height, the type of activity the expedition cart 100 is to be used for, and user preferences. For example, the sleeves 124, 126 can be flexibly connected to the gusset plates 112, 114 by center pinning and can include a spring-loaded pin configured to be received in graduated holes formed in the gusset plates 112, 114. In some embodiments, the gusset plates 112, 114 can include a viewable protractor adjacent to the graduated holes to indicate to a user the different angles of inclination relative to the loading deck. The sleeves 124, 126 can thereby be adjusted at the point-of-sale based on user characteristics, user activities, or both, or can be adjusted in the field based on, for example, varying slopes of travel.

The sleeves 124, 126 can be mounted substantially parallel relative to each other. The cross-sectional configuration of the sleeves 124, 126 can be, e.g., square, circular, and the like, and can be configured and dimensioned to receive a respective shaft arm 128, 130, e.g., handle, therein. In some embodiments, the sleeves 124, 126 can define two open ends. In some embodiments, the sleeves 124, 126 can define only one open end configured to receive a portion of the shaft arm 128, 130 and the closed opposing end can assist in retaining the shaft arm 128, 130 secured within the sleeve 124, 126.

As discussed above, the expedition cart 100 includes a pair of shaft arms 128, 130 which define a proximal end 132 and a distal end 134. The shaft arms 128, 130 can be detachably secured to and can extend from the respective sleeves 124, 126. In particular, the proximal end 132 of the shaft arms 128, 130 can be secured to the chassis 102 at the sleeves 124, 126, and the distal end 134 of the shaft arms 128, 130 can be gripped by a user, secured to a belt or harness of a user, or both. The shaft arms 128, 130 length can be calculated to satisfy load overhang, leg stride, waist height, combinations thereof, and the like. Although illustrated as fixed in length, in some embodiments, the shaft arms 128, 130 can be, e.g., customized by user characteristics, customized by user activity, telescoping to allow field adjustments or customization based on varying topographic contours and user characteristics (see, for example, FIG. 10).

The shaft arms 128, 130 can be galvanically compatible, rustproofed, gasketed, primed and/or painted and can be axially reliable. In some embodiments, the shaft arms 128, 130 can be circular in cross-section. In some embodiments, the shaft arms 128, 130 can define a square cross-section. The shaft arms 128, 130 can be fabricated from, e.g., aluminum, titanium, carbon, steel, and the like. In some embodiments, the shaft arms 128, 130 can be filled with a dampening material, e.g., a core rod of acrylonitrile butadiene styrene (ABS) plastic, to absorb and dampen impact stresses. In some embodiments, the shaft arms 128, 130 can include caps 136 on the bottom portion of the proximal end 132 to prevent intrusion of dirt and debris.

In some embodiments, after being inserted into the sleeves 124, 126, the proximal end 132 of the shaft arms 128, 130 can be releasably secured in the sleeves 124, 126 by respective clevis pins 138. For example, the sleeves 124, 126 can include guide holes passing through the width of the sleeves 124, 126 and the shaft arms 128, 130 near the proximal end 132 can include a complementary guide hole passing through the width of the shaft arms 128, 130.

The guide holes can be configured and dimensioned to receive a quick release wire lock clevis pin 138. Thus, when the proximal ends 132 of the shaft arms 128, 130 are inserted into the respective sleeves 124, 126, clevis pins 138 can be used to releasably lock the shaft arms 128, 130 within the sleeves 124, 126. In some embodiments, two clevis pins 138 can be used for each shaft arm 128, 130 to ensure a rigid connection between the sleeves 124, 126 and shaft arms 128, 130.

Figure 7:
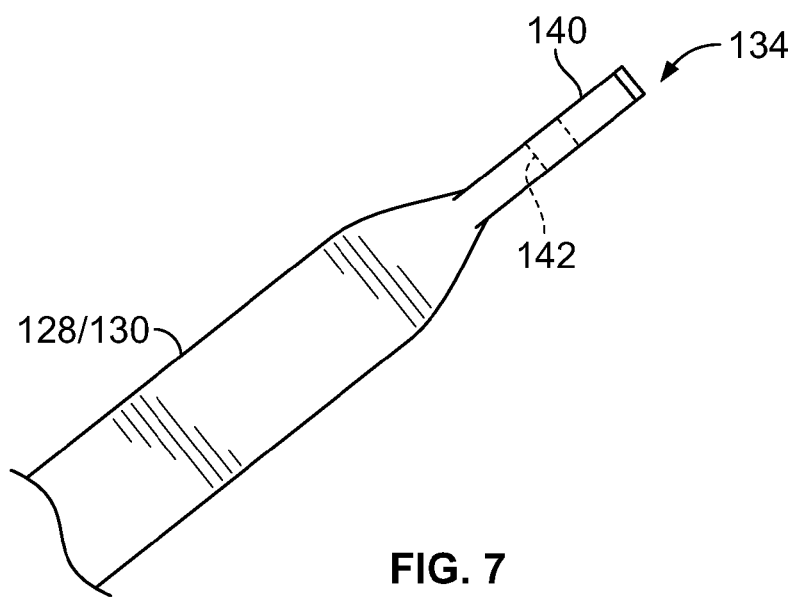
FIG. 7 is a detailed, side view of a handle of the exemplary expedition cart of FIG. 1.
Figure 8:
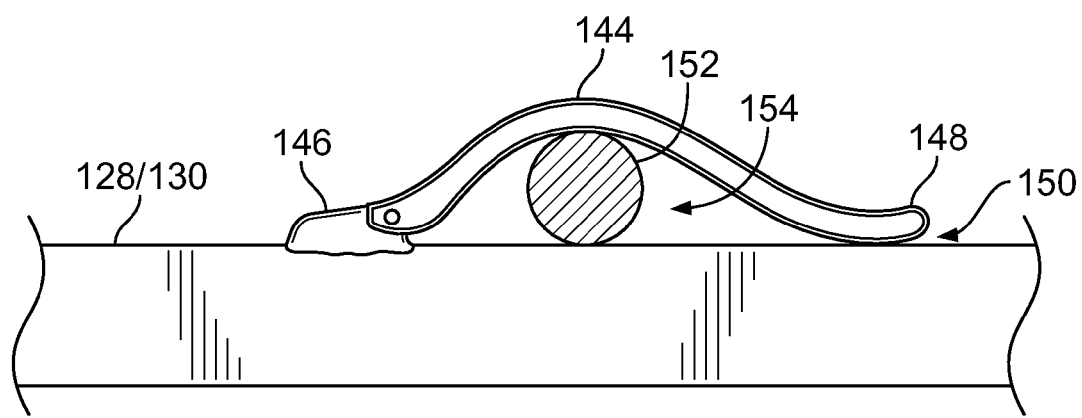
FIG. 8 is a detailed, side view of a handle of the exemplary expedition cart of FIG. 1.
Figure 9:
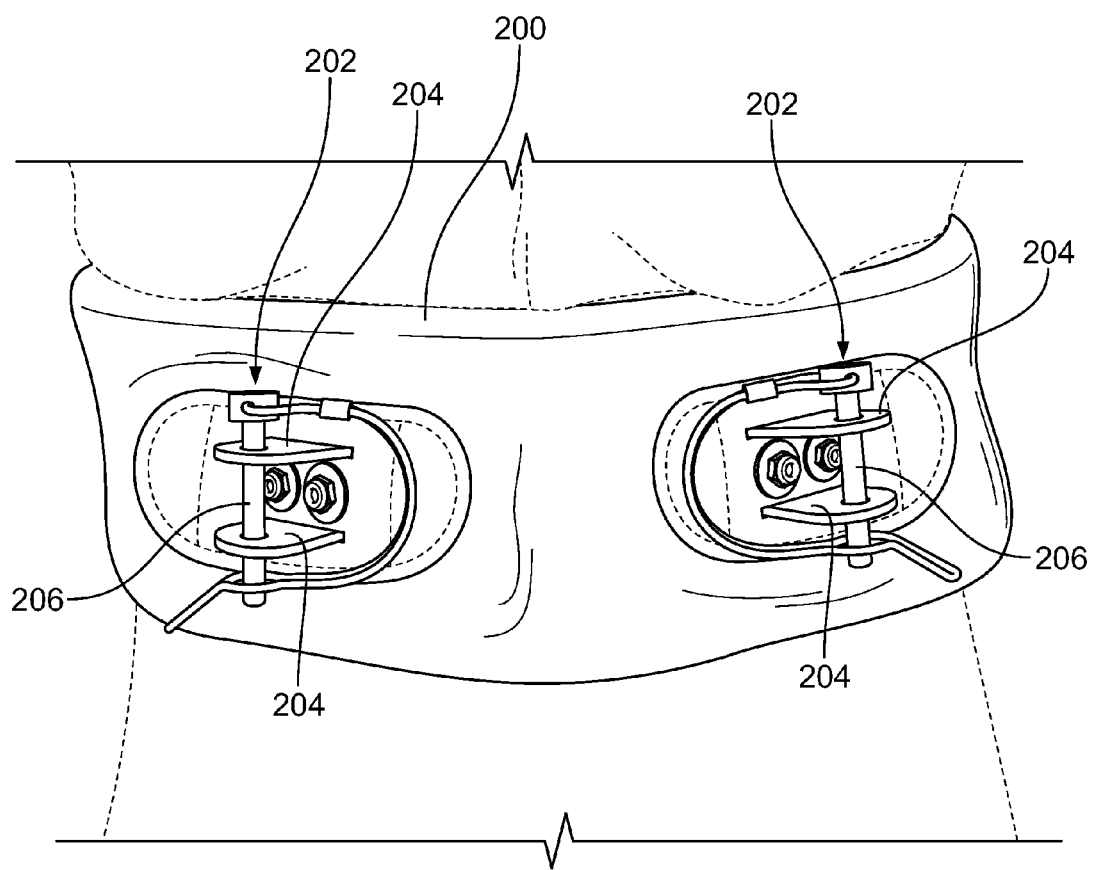
FIG. 9 is a perspective view of an exemplary harness configured to releasably receive a handle of the exemplary expedition cart of FIG. 1.

In some embodiments, the distal end 134 of the shaft arms 128, 130 can include a gripping structure thereon, e.g., a textured surface, a foam cover, a rubber cover, and the like, to provide an area at which the user can grip the shaft arms 128, 130 for pulling the expedition cart 100. With reference to FIG. 7, in some embodiments, a portion of the distal end 134 of the shaft arms 128, 130 can be flattened into a horizontal or vertical paddle 140. For example, a portion of the shaft arms 128, 130 can be peened flat into the flattened paddle 140 configuration. Each of the paddles 140 can include a center boring 142 passing therethrough. The paddle 140 and the boring 142 can be configured and dimensioned to releasably interlock relative to a waist belt or torso/shoulder harness worn by a user (see, for example, FIG. 9). As will be discussed in greater detail below, the flattened paddle 140 can be positioned between two separated flanges including complementary center bores and, for example, respective quick release wire lock clevis pins can be used to secure the shaft arms 128, 130 relative to the belt or harness of a user. Thus, rather than gripping and pulling the expedition cart 100, the expedition cart 100 can be secured to the belt or harness of a user and the user can maintain free hands for alternative purposes.

The exemplary expedition cart 100 discussed herein can also be implemented for pushing a load. In particular, with reference to FIG. 8, each of the arm shafts 128, 130 can include a cross bar bracket 144 secured thereon. The brackets 144 can be secured to a top surface of the arm shafts 128, 130, e.g., a surface facing away from the ground. In some embodiments, the brackets 144 can be secured to a bottom surface of the arm shafts 128, 130, e.g., a surface facing the ground. The brackets 144 can be in the form of a spring clip. A first end 146 of the brackets 144 facing away from the distal end 134 of the arm shafts 128, 130 can be fixedly secured (e.g., welded) to the arm shafts 128, 130 and an opposing second end 148 facing the user can be configured to lift up to create an opening 150. In some embodiments, the first end 146 can include a hinge at which the bracket 144 can pivot. In some embodiments, the first end 146 can be substantially continuous and the spring force within the bracket 144 can allow flexing of the bracket 144. As an example, the second end 148 of each bracket 144 can be lifted to create an opening 150 for passage of an elongated structure 152, e.g., a walking stick, a cross bar, and the like. Upon insertion of the elongated structure 152 under the bracket 144, the bracket 144 can spring back to an unopened positioned and can retain the elongated structure 152 within a substantially complementary region 154 formed between the shaft arms 128, 130 and the bracket 144. A push bar can thereby be formed for pushing the expedition cart 100.

In some embodiments, the elongated structure 152 can also be used to pull the expedition cart 100. In particular, the spring force within the brackets 144 can be sufficiently high to maintain the elongated structure 152 within the region 154 during pulling of the expedition cart 100. In some embodiments, a locking mechanism can be implemented for releasably locking the elongated structure 152 within the region 154.

As discussed above, and with reference to FIG. 9, an exemplary harness 200, e.g., a belt, is provided for releasably interlocking with the expedition cart 100. Although illustrated as worn around the waist of a person, it should be understood that alternative configurations of harnesses can be used with the interlocking mechanisms discussed herein. In particular, the harness 200 includes two interlocking mechanisms 202 horizontally spaced relative to each other. Each of the interlocking mechanisms 202 includes a pair of spaced flanges 204 with a hole passing therethrough. The interlocking mechanisms 202 further include a clevis pin 206, e.g., a wire lock clevis pin 206, configured and dimensioned to pass through the holes of the flanges 204 and releasably interlock relative to the flanges 204. A user can thereby insert the respective flattened paddle 140 portions of the shaft arms 128, 130 in the space formed between the flanges 204 and the clevis pins 206 can be passed through the holes in the flanges 204 and the boring 142 of the flattened paddles 140 to interlock the shaft arms 128, 130 relative to the harness 200. Thus, rather than pulling the expedition cart 100 by gripping the shaft arms 128, 130, the user can pull the expedition cart 100 with the harness 200 while maintaining their hands free for alternative purposes.

Figure 10:
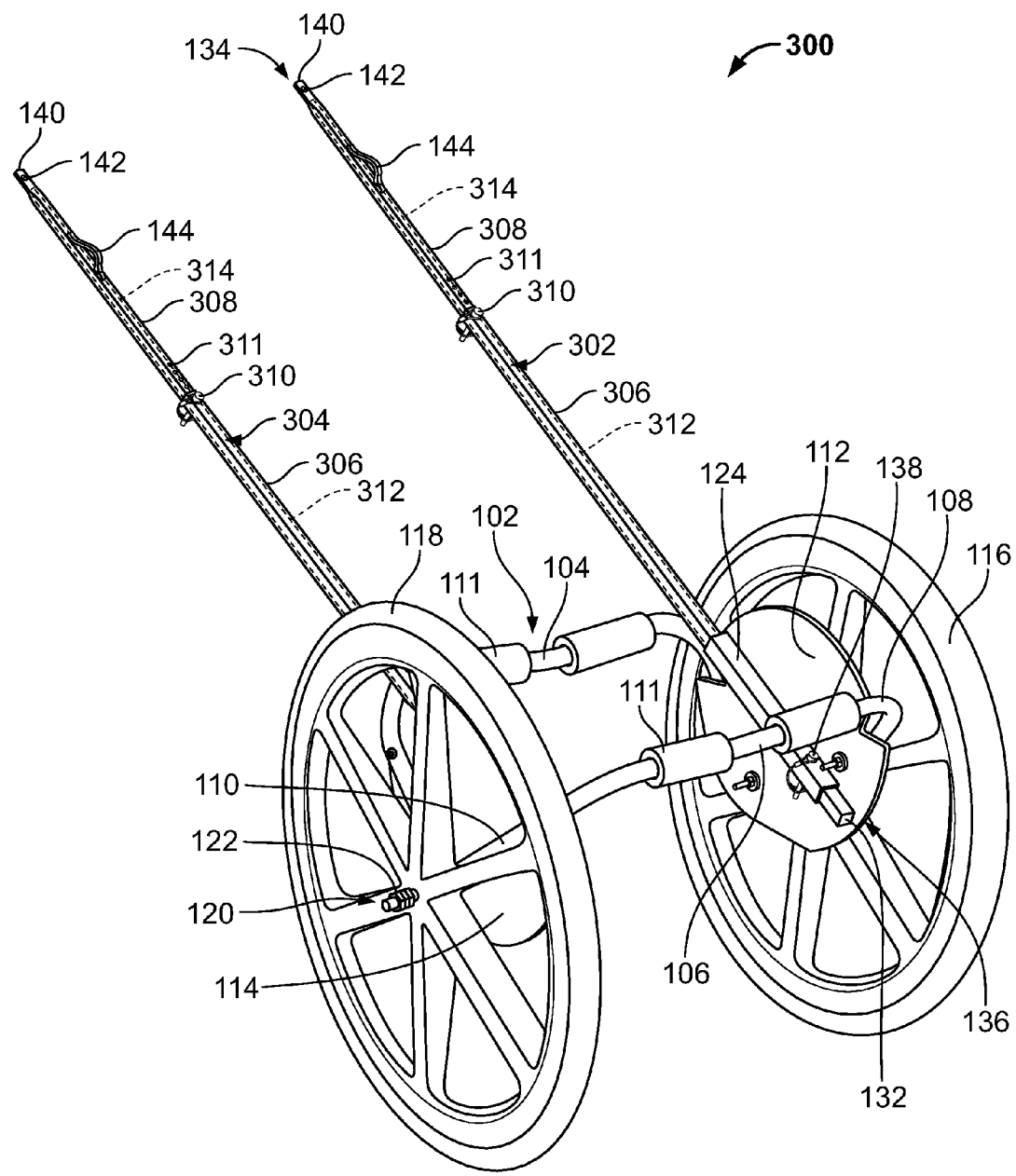
FIG. 10 is a perspective view of an exemplary expedition cart including telescoping handles according to the present disclosure.

With reference to FIG. 10, an alternative expedition cart 300 is provided. In particular, the expedition cart 300 can be substantially similar in structure and function to the expedition cart 100 discussed above, except for the distinctions noted herein. Therefore, similar structures are marked with similar reference numbers.

The expedition cart 300 includes telescoping shaft arms 302, 304. In particular, each shaft arm 302, 304 includes a first shaft arm 306 and a second shaft arm 308, e.g., first and second tubular members, which translate relative to each other. For example, the second shaft arm 308 can translate within the first shaft arm 306 to allow the length of the shaft arms 302, 304 to be adjusted or customized based on, e.g., user characteristics, user activities, user preferences, and the like.

One or more clevis pins 310, e.g., wire lock clevis pins, can be implemented for detachably interlocking the first and second shaft arms 306, 308 relative to each other. For example, the first shaft arm 306 can include a hole passing therethrough configured and dimensioned to receive the clevis pin 310 therethrough. Similarly, the second shaft arm 308 can include a plurality of spaced holes 311 along the length of the second shaft arm 308 for alignment with the hole of the first shaft arm 306 and receipt of the clevis pin 310. Thus, the first shaft arms 306 can be inserted into and interlocked relative to the sleeves 124, 126, and the length of the shaft arms 302, 304 can be adjusted for user preferences by translating the second shaft arm 308 within the first shaft arm 306. In some embodiments, the first shaft arm 306, the second shaft arm 308, or both, can be filled with a dampening material 312, 314, e.g., a core rod of ABS plastic or a similar material, to absorb and dampen impact stresses.

Figure 11:
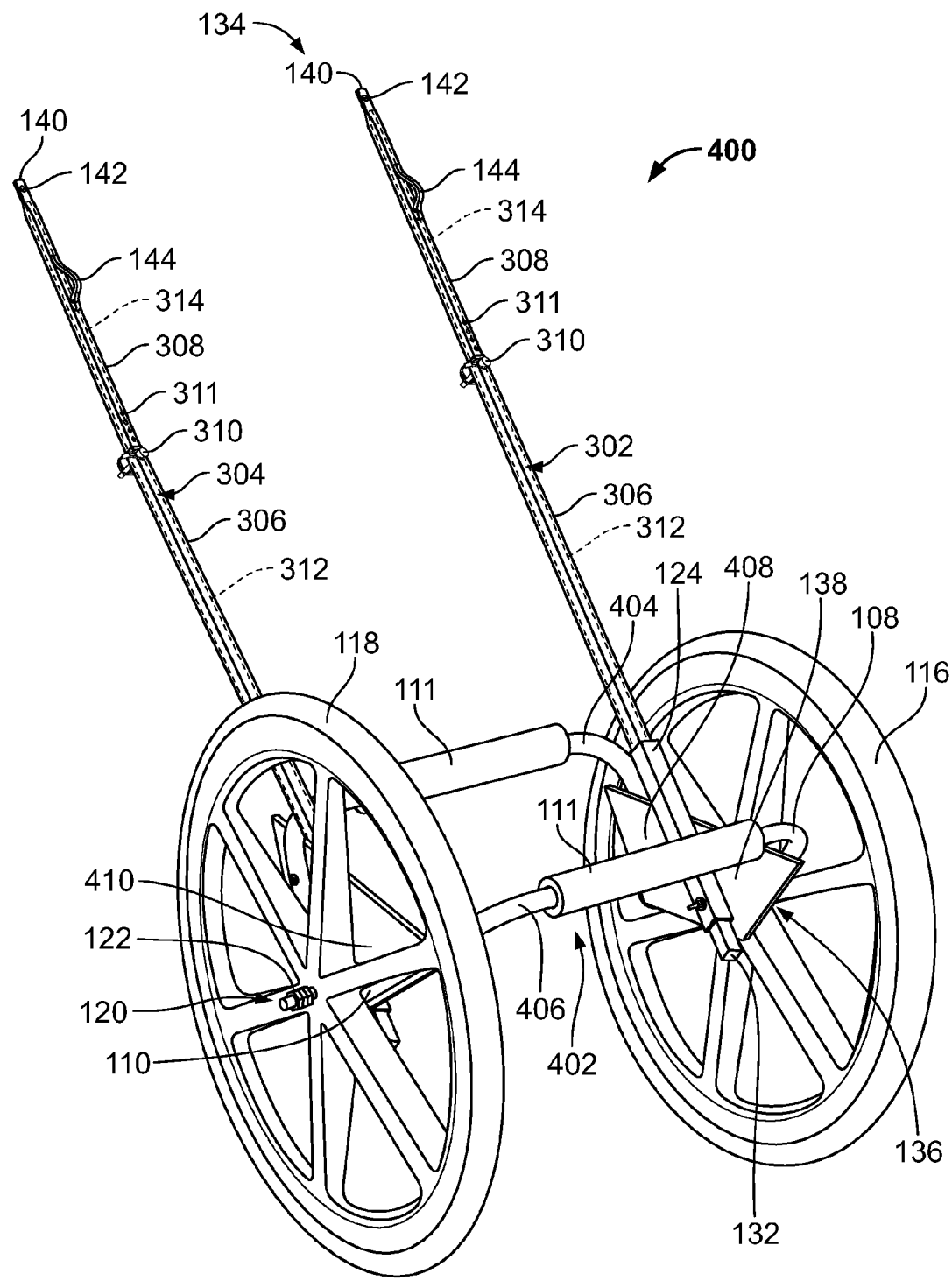
FIG. 11 is a perspective view of an exemplary expedition cart according to the present disclosure.

With reference to FIG. 11, an alternative expedition cart 400 is provided. In particular, the expedition cart 400 can be substantially similar in structure and function to the expedition carts 100, 300 discussed above, except for the distinctions noted herein. Therefore, similar structures are marked with similar reference numbers.

The expedition cart 400 includes a chassis 402 including substantially linear horizontal segments 404, 406. Thus, rather than defining a bend or curve in the horizontal segments 104, 106, the horizontal segments 404, 406 extend linearly between the side segments 108, 110. In addition, the gusset plates 408, 410 of the expedition cart 400 can be substantially trapezoidal in configuration. The trapezoidal configuration allows contact points on both sides of the gusset plates 408, 410 against the side segments 108, 110 and provides sufficient surface area for mounting the sleeves 124, 126. However, the trapezoidal configuration reduces the amount of material for fabrication, thereby reducing the weight of the expedition cart 400.

Figure 12:
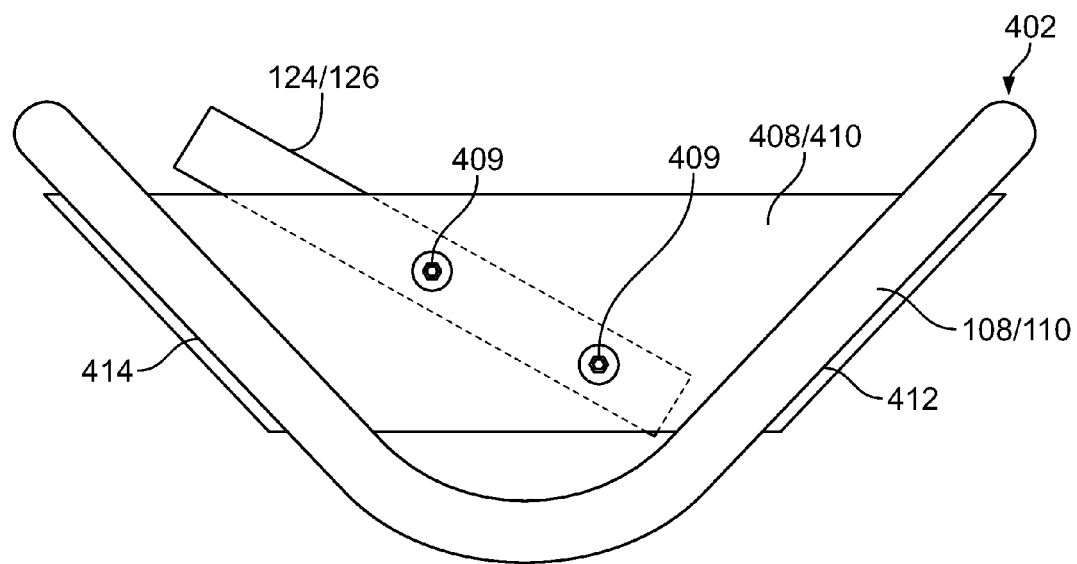
FIG. 12 is a detailed, side view of an exemplary gusset plate and sleeve according to the present disclosure.

With reference to FIG. 12, in some embodiments, the sleeves 124, 126 can be fixedly bolted to the gusset plates 408, 410 based on an angle of the sleeves 124, 126 relative to the loading deck determined during fabrication. For example, the sleeves 124, 126 can be bolted to the gusset plates 408, 410 with two bolts 409. The shaft arms 302, 304 therefore extend from the chassis 402 at a fixed angle. If an adjustment of the orientation of the chassis 402 is desired, the telescoping shaft arms 302, 304 can be implemented to regulate the length of the shaft arms 302, 304 which, in turn, affect the orientation of the chassis 402.

Figure 13:
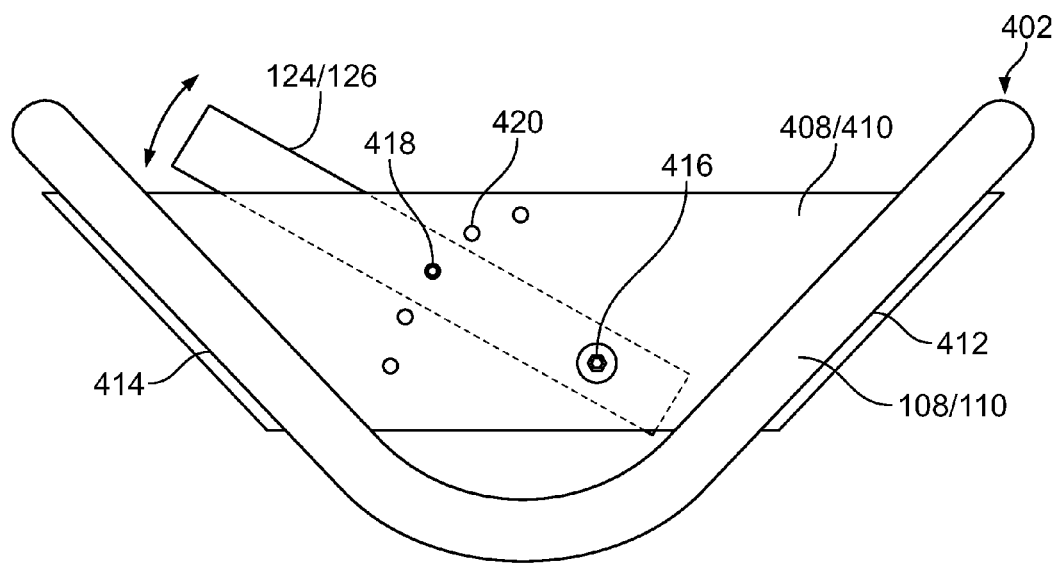
FIG. 13 is a detailed, side view of an exemplary gusset plate and adjustable sleeve according to the present disclosure.

With reference to FIG. 13, in some embodiments, the sleeves 124, 126 can be pivotally secured to the gusset plates 408, 410. In particular, the sleeves 124, 126 can be mounted such that an angle of the sleeves 124, 126 relative to the loading deck can be adjusted or customized by the user to vary the angle at which the shaft arms 302, 304 extend from the chassis 402. For example, the sleeves 124, 126 can include respective pivot points 416, e.g., an axle, rotatably connecting the sleeves 124, 126 to the gusset plates 408, 410. The sleeves 124, 126 can rotate about the pivot points 416 to adjust the angle of inclination of the sleeves 124, 126. Adjustment of the angle of inclination of the sleeves 124, 126 can ensure that the loading deck of the chassis 402 is positioned substantially level to the ground during transport on level ground. In particular, based on the angle adjustment, the chassis 402 can be positioned substantially parallel to the ground at all slopes.

Each of the sleeves 124, 126 can include a spring-loaded pin 418, e.g., a locking mechanism, protruding therefrom at a position spaced from the pivot point 416. The spring-loaded pin 418 can be configured and dimensioned to snap into a complementary hole 420 formed in the gusset plates 408, 410. In particular, the gusset plates 408, 410 can include a plurality of holes 420 radially spaced to allow the sleeves 124, 126 to be interlocked at a variety of angles of inclination. In some embodiments, the angle of inclination of the sleeves 124, 126 can be varied within a range of, e.g., approximately fifteen degrees, eighteen degrees, twenty degrees, and the like. To release and rotate the sleeves 124, 126, the spring-loaded pin 418 can be depressed by a user. In some embodiments, the gusset plates 408, 410 can include markings or angles adjacent to the respective holes 420 to indicate to a user the angle of the sleeve 124, 126 relative to the loading deck of the chassis 402. Although illustrated as spring-loaded pins 418, it should be understood that alternative interlocking mechanisms, e.g., a ratcheting mechanism, can be used to releasably secure the sleeves 124, 126 relative to the gusset plates 408, 410.

With reference to FIG. 14, in some embodiments, the side segments 108, 110 of the chassis 402 can be angled or splayed relative to the horizontal segments 104, 106. In particular, the side segments 108, 110 can be angled outward at approximately five degrees such that the side segments 108, 110 are positioned further apart relative to each other at the nadir than at the connecting portions at the horizontal segments 104, 106. The wheels 116, 118 can thereby be mounted to the side segments 108, 110 in an angled or splayed manner to provide greater stability to the expedition cart 400.

With reference to FIG. 15, in some embodiments, the side segments 108, 110 of the chassis 402 can be substantially perpendicular relative to the horizontal segments 104, 106. In particular, the side segments 108, 110 can be substantially parallel relative to each other. The wheels 116, 118 can thereby be mounted to the side segments 108, 110 and relative to each other in a parallel manner.

The expedition carts discussed herein can substantially reduce the amount of load supported by a user. In particular, the expedition carts reduce the amount of pull force to the horizontal component of the weight of the load, plus the friction component due to the wheels. As an example, the expedition cart can be expected to pull an approximately 100 lb load over most surfaces with less than approximately 20 lbs of pull force. The substantial reduction in support allows the user to travel through a variety of terrains while simultaneously transporting a large amount of supplies.

The expedition carts discussed herein can be fabricated from lightweight, yet rigid, materials, thereby resulting in expedition carts which are extremely light and transportable. If a user encounters severely sloped ascents and descents, is required to carry the expedition cart across a river or over muddy conditions, or desires to transport the expedition cart when it is not in use, the expedition cart can be efficiently disassembled for transport within a short time period. For example, the shaft arms can be separated from the respective sleeves by removing the clevis pins and the shaft arms can be pulled out of the sleeves. If telescoping shaft arms are implemented, the shaft arms can be collapsed into a configuration of minimum length. The remaining assembly of the expedition cart can be carried by hand or mounted/strapped to a pack for transport. As discussed above, the wheels can be dimensioned such that when the expedition cart is strapped to a pack, there is sufficient clearance for the pack and the wheels are positioned adjacent to the back of a user. In particular, the implementation of separate hub bolts (rather than a single axle) allows the wheels to fit around the sides of the pack in a more compact and comfortable carrying position.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. An expedition cart, comprising:
a chassis configured and dimensioned to support a load,
a first gusset plate and a second gusset plate secured to the chassis, each of the first and second gusset plates including side mounting surfaces, and
a first sleeve attached to the side mounting surface of the first gusset plate and a second sleeve attached to the side mounting surface of the second gusset plate,
wherein the first sleeve is configured and dimensioned to releasably receive therein at least a portion of a first shaft arm, and
wherein the second sleeve is configured and dimensioned to releasably receive therein at least a portion of a second shaft arm.

2. The expedition cart according to claim 1, wherein the first and second shaft arms are telescoping.

3. The expedition cart according to claim 2, wherein each of the first and second shaft arms comprises a first tubular member and a second tubular member, the second tubular member configured to translate within the first tubular member.

4. The expedition cart according to claim 1, wherein the chassis comprises a pair of horizontal segments joined by a pair of side segments.

5. The expedition cart according to claim 4, wherein the pair of side segments are V-shaped, the first gusset plate extends across a first side segment of the pair of side segments between two opposing contact points of the first side segment, and the second gusset plate extends across a second side segment of the pair of side segments between two opposing contact points of the second side segment.

6. The expedition cart according to claim 4, wherein the pair of side segments are outwardly splayed relative to the pair of horizontal segments.

7. The expedition cart according to claim 6, comprising first and second wheels mounted to the pair of side segments, the first and second wheels being outwardly splayed relative to the pair of horizontal segments.

8. The expedition cart according to claim 1, wherein the first sleeve is fixedly attached to the side mounting surface of the first gusset plate and the second sleeve is fixedly attached to the side mounting surface of the second gusset plate.

9. The expedition cart according to claim 1, wherein the first sleeve is pivotally attached to the side mounting surface of the first gusset plate and the second sleeve is pivotally attached to the side mounting surface of the second gusset plate.

10. The expedition cart according to claim 9, wherein pivoting the first and second sleeves relative to the first and second gusset plates varies an angle of inclination of the first and second shaft arms relative to the first and second gusset plates and the chassis.

11. The expedition cart according to claim 9, wherein each of the first sleeve and the second sleeve comprises a pivot point and a locking mechanism.

12. The expedition cart according to claim 9, wherein the first and second gusset plates comprise a plurality of radially spaced holes, each of the plurality of radially spaced holes being configured and dimensioned to receive a locking mechanism of the first and second sleeves.

13. The expedition cart according to claim 1, wherein each of the first and second shaft arms comprises a flattened distal portion, the flattened distal portion including a bore extending therethrough.

14. The expedition cart according to claim 13, wherein the flattened distal portion and the bore of each of the first and second shaft arms is configured to interlock relative to an interlocking mechanism of a belt or harness.

15. The expedition cart according to claim 1, wherein each of the first and second shaft arms is at least partially filled with a dampening material to absorb and dampen impact stresses.

16. The expedition cart according to claim 1, wherein each of the first and second shaft arms comprises a bracket near a distal end configured and dimensioned to releasably receive an elongated structure therein, the bracket being in the form of a spring-loaded clip.

17. An expedition cart system, comprising:
an expedition cart, the expedition cart including (i) a chassis configured and dimensioned to support a load, (ii) a first gusset plate and a second gusset plate secured to the chassis, each of the first and second gusset plates including side mounting surfaces, and (iii) a first sleeve attached to the side mounting surface of the first gusset plate and a second sleeve attached to the side mounting surface of the second gusset plate, and
a belt or harness, the belt or harness including a pair of interlocking mechanisms,
wherein the first sleeve is configured and dimensioned to releasably receive therein at least a portion of a first shaft arm,
wherein the second sleeve is configured and dimensioned to releasably receive therein at least a portion of a second shaft arm, and
wherein the pair of interlocking mechanisms is configured and dimensioned to releasably interlock the first and second shaft arms therein.

18. A method of assembling an expedition cart, comprising:
providing an expedition cart, the expedition cart including (i) a chassis configured and dimensioned to support a load, (ii) a first gusset plate and a second gusset plate secured to the chassis, each of the first and second gusset plates including side mounting surfaces, and (iii) a first sleeve attached to the side mounting surface of the first gusset plate and a second sleeve attached to the side mounting surface of the second gusset plate,
releasably securing at least a portion of a first shaft arm within the first sleeve, and
releasably securing at least a portion of a second shaft arm within the second sleeve.

19. The method according to claim 18, comprising pivoting the first and second sleeves to vary an angle of inclination of the first and second shaft arms relative to the first and second gusset plates and the chassis.

20. An expedition cart, comprising:
a chassis configured and dimensioned to support a load,
a first gusset plate and a second gusset plate secured to the chassis, each of the first and second gusset plates including side mounting surfaces, and
a first sleeve attached to the side mounting surface of the first gusset plate and a second sleeve attached to the side mounting surface of the second gusset plate,
wherein the first sleeve is configured and dimensioned to releasably receive therein at least a portion of a first shaft arm, wherein the second sleeve is configured and dimensioned to releasably receive therein at least a portion of a second shaft arm, and wherein the first sleeve is pivotally attached to the side mounting surface of the first gusset plate and the second sleeve is pivotally attached to the side mounting surface of the second gusset plate.

21. An expedition cart, comprising:

a chassis configured and dimensioned to support a load, a first gusset plate and a second gusset plate secured to the chassis, and a first sleeve mounted to the first gusset plate and a second sleeve mounted to the second gusset plate, wherein the first sleeve is configured and dimensioned to releasably receive therein at least a portion of a first shaft arm, wherein the second sleeve is configured and dimensioned to releasably receive therein at least a portion of a second shaft arm, and wherein each of the first and second shaft arms comprises a bracket disposed near a distal end configured and dimensioned to releasably receive an elongated structure therein such that the elongated structure extends between the first and second shaft arms, each of the brackets includes a first end secured to the respective first and second shaft arms and an opposing second end configured to lift up from the respective first and second shaft arms to create an opening for insertion of the elongated structure.

22. An expedition cart, comprising:

a chassis configured and dimensioned to support a load, the chassis including first and second side segments on opposing sides of the chassis, a first gusset plate secured to the first side segment of the chassis and a second gusset plate secured to the second side segment of the chassis, the first gusset plate extending across the first side segment between two opposing contact points with the first side segment, the second gusset plate extending across the second side segment between two opposing contact points with the second side segment, and each of the first and second gusset plates including side mounting surfaces, and a first sleeve attached to the side mounting surface of the first gusset plate and a second sleeve attached to the side mounting surface of the second gusset plate, wherein the first sleeve is configured and dimensioned to releasably receive therein at least a portion of a first shaft arm, and wherein the second sleeve is configured and dimensioned to releasably receive therein at least a portion of a second shaft arm.

* * * * *